(12) United States Patent
Wang et al.

(10) Patent No.: US 10,627,238 B2
(45) Date of Patent: Apr. 21, 2020

(54) INTEGRATED NAVIGATION SYSTEM AND POSITIONING METHOD THEREOF

(71) Applicant: ComNav Technology Ltd., Shanghai (CN)

(72) Inventors: Yongquan Wang, Shanghai (CN);
Liduan Wang, Shanghai (CN)

(73) Assignee: COMNAV TECHNOLOGY LTD., Shanghai (CN)

( * ) Notice: Subject to any disclaimer, the term of this patent is extended or adjusted under 35 U.S.C. 154(b) by 0 days.

(21) Appl. No.: 16/235,121

(22) Filed: Dec. 28, 2018

(65) Prior Publication Data

US 2019/0219400 A1 Jul. 18, 2019

(30) Foreign Application Priority Data

Dec. 29, 2017 (CN) .......................... 2017 1 1474497

(51) Int. Cl.
| | |
|---|---|
| *G01C 21/16* | (2006.01) |
| *G01S 19/44* | (2010.01) |
| *G01S 19/47* | (2010.01) |
| *G01S 19/49* | (2010.01) |

(52) U.S. Cl.
CPC ............ *G01C 21/165* (2013.01); *G01S 19/44* (2013.01); *G01S 19/47* (2013.01); *G01S 19/49* (2013.01)

(58) Field of Classification Search
CPC ........ G01C 21/165; G01S 19/47; G01S 19/44
See application file for complete search history.

(56) References Cited

U.S. PATENT DOCUMENTS

| | | | |
|---|---|---|---|
| 6,496,778 B1 * | 12/2002 | Lin ......................... | G01S 19/55 701/470 |
| 2001/0020216 A1 * | 9/2001 | Lin ....................... | G01C 21/165 701/472 |
| 2004/0138813 A1 * | 7/2004 | Syrjarinne ............ | G01S 5/0009 701/478 |

(Continued)

*Primary Examiner* — Marisol Figueroa
(74) *Attorney, Agent, or Firm* — Cantor Colburn LLP

(57) ABSTRACT

The present invention provides an integrated navigation system and its positioning method, and it pertains to the technical field of satellite navigation. The integrated navigation system of the present invention comprises a GNSS resolving module, an integrated navigation filter and an auxiliary navigation module using a sensor, wherein the auxiliary navigation module outputs corresponding positioning and/or orientation measurements to the integrated navigation filter; the GNSS resolving module is able to output the floating point solution or single point solution; the integrated navigation system further comprises a smoothing filter provided corresponding to the GNSS resolving module, which is configured to perform a smooth filtering processing on the floating point solution or single point solution to obtain smooth floating point solution or smooth single point solution respectively; the integrated navigation filter is configured to perform integrated filtering on the received smooth floating point solution or smooth single point solution and the corresponding received positioning and/or orientation measurements to obtain the corresponding positioning and/or orientation variable error estimate and sensor error estimate. The integrated navigation system of the present invention has high positioning accuracy and low implementation cost.

20 Claims, 4 Drawing Sheets

(56) References Cited

U.S. PATENT DOCUMENTS

2010/0169001 A1* 7/2010 Scherzinger ......... G01C 21/005
                                                 701/467
2017/0184404 A1* 6/2017 Buck ..................... G01C 21/16

* cited by examiner

INTEGRATED NAVIGATION SYSTEM AND POSITIONING METHOD THEREOF

CROSS-REFERENCE TO RELATED APPLICATION

The present application claims priority under 35 U.S.C. § 119 to Chinese patent application No. 201711474497.0, filed on Dec. 29, 2017, the entirety of which is hereby incorporated by reference herein and forms a part of the specification.

TECHNICAL FIELD

The present invention relates to the technical field of satellite navigation, in particular to an integrated navigation system comprising a GNSS (Global Navigation Satellite System) resolving module, an integrated navigation filter and an auxiliary navigation module using a sensor, and a positioning method thereof.

BACKGROUND OF THE INVENTION

Nowadays, positioning devices are popular and widely used, however, there is existing at least one problem of low positioning accuracy.

SUMMARY OF THE INVENTION

In order to solve at least one aspect of the above-mentioned problems or other problems, the present invention proposes the following technical solutions.

According to one aspect of the present invention, an integrated navigation system is provided, which comprises a GNSS resolving module, an integrated navigation filter and an auxiliary navigation module using a sensor, wherein the auxiliary navigation module outputs corresponding positioning and/or orientation measurements to the integrated navigation filter; and the GNSS resolving module is able to output a floating point solution or a single point solution, the integrated navigation system further comprises:

a smoothing filter provided corresponding to the GNSS resolving module, wherein the smoothing filter is configured to smooth filtering the floating point solution or single point solution to obtain a smooth floating point solution or a smooth single point solution respectively;

wherein the integrated navigation filter is configured to perform integrated filtering on the received smooth floating point solution or smooth single point solution and the corresponding received positioning and/or orientation measurements so as to obtain corresponding positioning and/or orientation variable error estimates and sensor error estimate.

According to another aspect of the present invention, an OEM board is provided, which carries the above-mentioned integrated navigation system.

According to still another aspect of the present invention, a receiver is provided, which comprises the above-mentioned OEM board.

According to yet another aspect of the present invention, a positioning method of the integrated navigation system is provided, which comprises the steps of:

receiving satellite signals;

resolving according to qualities of the received satellite signals to obtain a floating point solution or a single point solution;

smooth filtering the floating point solution or single point solution so as to obtain a smooth floating point solution or a smooth single point solution respectively; and performing integrated filtering to the obtained smooth floating point solution or smooth single point solution and the corresponding received positioning and/or orientation measurements so as to obtain corresponding positioning and/or orientation variable error estimates and sensor error estimate.

According to yet another aspect of the present invention, a computer device is provided, which comprises a memory, a processor, and computer programs stored in the memory and executable on the processor, wherein the processor carries out steps of the above-mentioned positioning method when executing the programs.

According to yet another aspect of the present invention, a computer-readable storage medium is provided, which has computer programs stored thereon, wherein said programs are executed by the processor so as to carry out the steps of the above-mentioned positioning method.

The above features and operations of the present invention will become clearer from the following descriptions and drawings.

BRIEF DESCRIPTION OF THE DRAWINGS

The above-mentioned and other objects and advantages of the present invention will become more complete and apparent from the following detailed descriptions with reference to the accompanying drawings, wherein the same or similar elements are denoted by the same reference numeral.

DETAILED DESCRIPTION OF THE INVENTION

Figure 1:
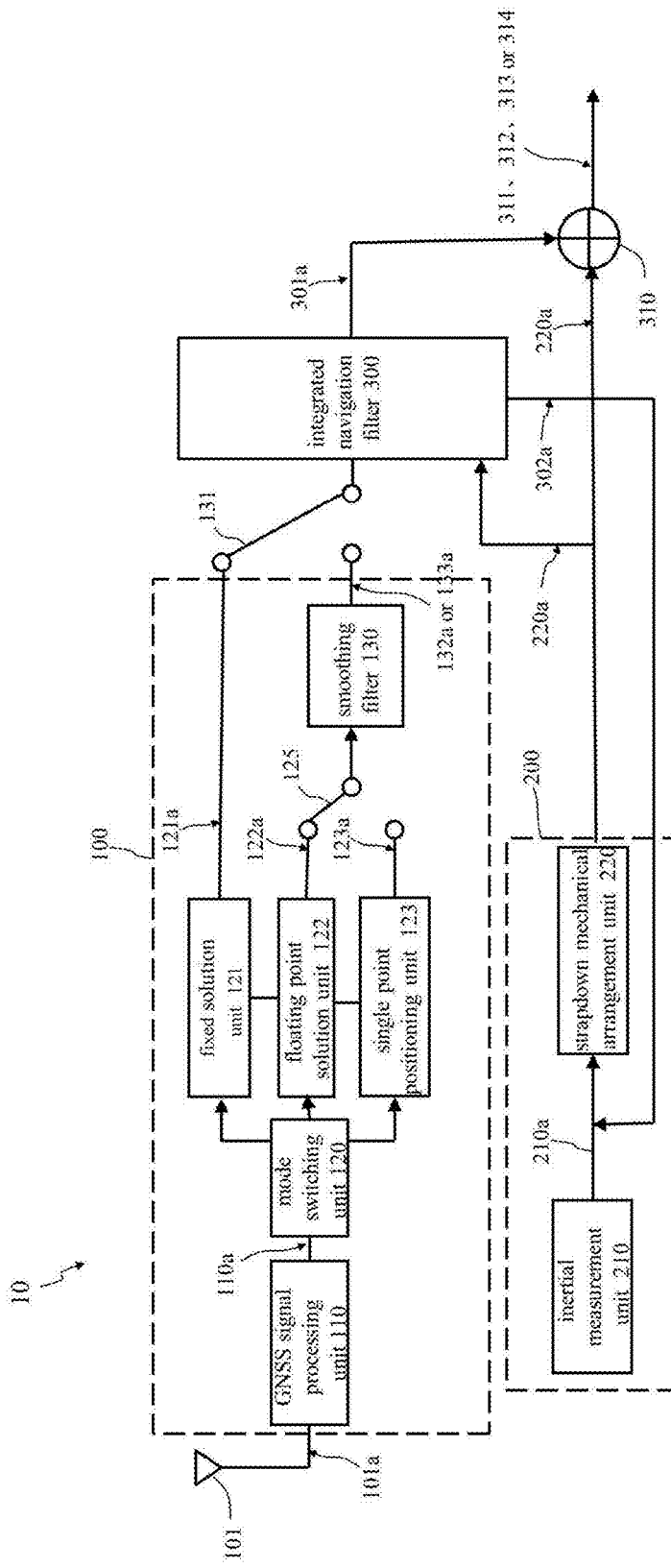
FIG. 1 is a schematic diagram of the module structure of an integrated navigation system according to one embodiment of the present invention.

As the positioning accuracy of the GNSS is becoming higher and higher and the coverage of the GNSS signals is becoming wider and wider, more and more navigation system terminals are used in mobile carriers like vehicles, unmanned aerial vehicles, etc. to help them locate and navigate. Besides, in the field of satellite navigation, unremitting efforts have been made to improve the positioning and/or orientation performance of the navigation system thermals, especially the positioning and/or orientation accuracy, the availability and continuity of the navigation system terminals when the GNSS signals received by the navigation system terminals have a poor quality or lose lock.

The prior art navigation and positioning technologies include, for example, the RTK (Real-time Kinematic) positioning technology and the GNSS/INS integrated navigation technology. However, there is still room for improvement for the positioning accuracy of the navigation system using said positioning technologies when operating in the floating-point mode or the pseudo-range single point positioning mode; moreover, in the case of the GNSS signals losing lock, the navigation system using the GNSS/INS integrated navigation technology has a poor navigation accuracy; meanwhile, the navigation system using the GNSS/INS integrated navigation technology has a high requirement on the performance of the inertial sensor used in the INS.

The present invention will be described in further detail below with reference to the drawings. Exemplary embodiments of the invention are shown in the drawings, but the present invention may be implemented in many different forms and it shall not be limited to the embodiments described herein. The embodiments are only provided to make the disclosure thorough and complete and to convey the idea of the present invention fully to those skilled in the art.

Some block diagrams in the drawings are functional entities, which do not necessarily correspond to physically or logically independent entities. Said functional entities may be realized in the form of software, or be realized in one or more hardware modules or integrated circuits, or in different processing devices and/or micro-controller devices.

In the embodiments of the present invention, the integrated navigation system uses and resolves GNSS signals to obtain corresponding solutions for positioning on the one hand, on the other hand, it uses an auxiliary navigation module to output corresponding positioning and/or orientation measurements which can be subjected to an integrated filtering processing together with said solutions to obtain corresponding solutions for realizing positioning. Wherein the auxiliary navigation module may use various types of sensors, such as an acceleration sensor, a speed sensor, a radar sensor, etc., to sense in real time various types of motion data (e.g. acceleration, speed, etc.) of the integrated navigation system or carriers (e.g. vehicles, unmanned aerial vehicles, etc.) with the integrated navigation system installed thereon, said motion data can be used as positioning and/or orientation variables and can be processed to obtain corresponding positioning and/or orientation measurements (e.g. inertial navigation solution). It shall be understood that the positioning and/or orientation measurements increase the amount of input of the integrated navigation filter, and they help to improve positioning accuracy, especially in the case where only a small number of GNSS signals is received by the navigation system terminal, or the received GNSS signals have a poor quality or lose lock.

In the following descriptions of the embodiments, the principles of the integrated navigation system and its positioning method according to the present invention will be illustrated by using the example that the auxiliary navigation module is an INS (inertial navigation system); correspondingly, the positioning and/or orientation measurements output by the INS are inertial navigation solutions.

FIG. 1 is a schematic diagram of the module structure of an integrated navigation system according to one embodiment of the present invention. As shown in FIG. 1, an integrated navigation system 10 is a GNSS/INS integrated navigation system in said embodiment, and it comprises a GNSS resolving module 100, an INS 200 and an integrated navigation filter 300. The GNSS resolving module 100 and the INS 200 can work concurrently. The INS 200, as a kind of auxiliary navigation module, can output inertial navigation solutions 220a as the corresponding positioning and/or orientation measurements.

In one embodiment, an inertial measurement unit (IMU) 210 is provided in the INS 200, which may include an inertial sensor (e.g. an acceleration sensor, an angular speed sensor, etc.) for collecting in real time the acceleration and/or angular speed information of the integrated navigation system 10, such that the inertial measurement unit 210 can at least output the acceleration and/or angular speed information 210a of the integrated navigation system 10 or its carrier. The specific type of the inertial measurement unit 210 is non-restrictive.

In one embodiment, a strapdown mechanical arrangement unit 220 is also provided in the INS 200. The strapdown mechanical arrangement unit 220 can use the acceleration and/or angular speed information 210a output from the inertial measurement unit 210 to calculate the inertial navigation solution 220a of the integrated navigation system 10 or any carrier having the integrated navigation system installed thereon. The inertial navigation solution 220a may include information of various variables (i.e. positioning and/or orientation variables) for positioning, such as position, speed, attitude, etc. The inertial navigation solution 220a output by the strapdown mechanical arrangement unit 220 can be input into an integrated navigation filter 300 as a positioning and/or orientation measurement.

Still referring to FIG. 1, the integrated navigation system 10 has an antenna 101 for receiving GNSS signals 101a in real time. It shall be understood that the GNSS signals 101a received by the antenna 101 are influenced by many factors such as the surrounding environment and the location, for example, environment conditions like trees and buildings around the integrated navigation system 10 will influence the quality of the received GNSS signals 101a, and relatively more and stronger GNSS signals 101a will be received in a relatively open environment. In the case of losing lock, the GNSS signals 101a received by the antenna 101 are smaller in number than a predetermined value and have a poorer quality, for example.

It shall be noted that the integrated navigation system 10 can also receive other signals (e.g. differential data (not shown in FIG. 1) from a reference station) through the antenna 101 or other components.

The GNSS signals 101a received by the antenna 101 can be transmitted to a GNSS resolving module 100, likewise, one or more kinds of other signals received by the antenna 101 (e.g. differential data from the reference station) can also be transmitted to the GNSS resolving module 100 as desired.

A GNSS signal processing unit 110 of the GNSS resolving module 100 is used for processing the GNSS signals 101a. For example, the GNSS signal processing unit 110 comprises a RF front-end processing module and a base band digital signal processing module. The RF front-end processing module processes the GNSS signals 101a received by the antenna 101, said signals are filtered and amplified by a prefilter and a preamplifier and then mixed with Sine wave local oscillator signals generated by a local oscillator so as to be down-converted into intermediate frequency signals, finally, the intermediate frequency signals are converted into discrete time digital intermediate frequency signals by an A/D converter. The base band digital signal processing module processes the digital intermediate frequency signals output from the RF front end so as to replicate local carrier and local pseudo-code signals consistent with the received satellite signals, thereby realizing capturing and tracking of the GNSS signals 101a to obtain measurements like the pseudo-range and carrier phase and demodulate navigation messages therefrom. The base band digital signal processing module is usually embodied as a combination of hardware and software, and the carrier demodulation and C/A code dispreading are usually performed by a digital signal processor which takes the form of ASIC hardware, while the signal tracking loop control software running in a microprocessor adjusts various operations of the digital signal processor through calculation. As for introductions about the GNSS signal processing unit 110, reference can be made to pages 237-238 of *GPS Principle and Design of Receiver* written by Xie Gang (Publishing House of Electronics Industry, July 2009).

In one embodiment, the GNSS resolving module 100 operably works in three modes to realize positioning based on the GNSS signals, i.e. fixed solution mode, floating point solution mode and pseudo-range single point positioning mode, correspondingly, a mode switching unit 120, a fixed solution unit 121, a floating point solution unit 122 and a single point positioning unit 123 are provided in the GNSS resolving module 100.

Wherein, the fixed solution unit 121 is used for outputting a corresponding fixed solution 121a when the GNSS resolving module 100 works in the fixed solution mode. During implementation of the fixed solution mode, an integer ambiguity in the carrier phase needs to be fixed for obtaining the corresponding fixed solution 121a. The mode switching unit 120 switches working units according to the signal quality, for example, the switching can be performed according to whether the current pseudo-range carrier ephemeris information 110a can realize fixing of the integer ambiguity, if the integer ambiguity can be fixed successfully, a switching is made to the fixed solution unit 121 and the fixed solution mode is adopted to output the fixed solution 121a.

If the integer ambiguity cannot be fixed successfully or cannot be fixed at all, the mode switching unit 120 sends a control signal to enable a switch from the fixed solution unit 121 to the floating point solution unit 122 and the floating point solution mode is adopted to output a floating point solution 122a; when the RTK resolution condition is not satisfied, the mode switching unit 120 generates a control signal to enable a switch to the single point positioning unit 123 and the pseudo-range single point positioning mode is adopted to output a single point solution 123a.

Further, if the differential data from the reference station can be received, the mode switching unit 120 will switch in preference to the floating point solution mode having a relatively higher positioning accuracy or to the fixed solution mode having higher accuracy than the floating point solution mode; if the differential data from the reference station cannot be received, the mode switching unit 120 will control to switch to the pseudo-range single point positioning mode having relatively low positioning accuracy. In other words, when the RTK resolution condition used for the fixed solution mode and the floating point solution mode is not satisfied, the mode switching unit 120 controls to switch to the single point positioning unit 123 and the pseudo-range single point positioning mode is adopted. The single point positioning unit 123 outputs the corresponding single point solution 123a when the GNSS resolving module 100 works in the pseudo-range single point positioning mode. In addition, when none of the above-mentioned three modes is operable, the GNSS resolving module 100 outputs an invalid solution.

It shall be noted that in the case where the number and quality of the received GNSS signals 101a change dynamically, or the surrounding environment of the integrated navigation system 10 or its carrier changes dynamically, the mode switching unit 120 can switch dynamically according to the above-described judgment conditions for switching.

Figure 3:
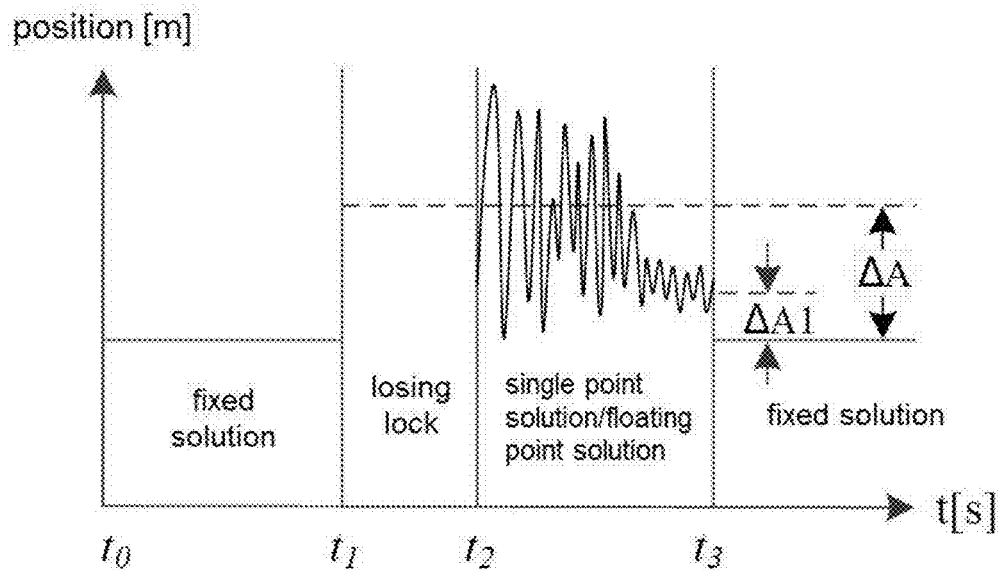
FIG. 3 is a schematic diagram of the performance of a navigation system using the RTK positioning technology.

It shall be noted that since the pseudo-range measurements used in the floating point solution mode and the pseudo-range single point positioning mode have large errors (e.g. noise, multi-path errors), if the floating point solution 122a or the single point solution 123a are directly used for positioning, the obtained final positioning result usually has low accuracy and large fluctuation (compared to the positioning result from the fixed resolution). FIG. 3 schematically illustrates the performance under the floating point solution mode and the pseudo-range single point positioning mode when the prior art RTK positioning technology is used. In FIG. 3, the horizontal axis represents time t, wherein t0, t1, t2 and t3 represent different positioning times. It can be seen that when the floating point solution or the single point solution is directly used for positioning, the root mean square (RMS) error is ΔA, which is larger compared to the positioning result from the fixed solution 121a. The optimal accuracy of such position mode is ΔA1.

Still referring to FIG. 1, the GNSS resolving module 100 is further provided with a smoothing filter 130. The smoothing filter 130 may be included in the GNSS resolving module 100 as shown in FIG. 1 and become a part of the GNSS resolving module, while in other embodiments, the smoothing filter 130 may be provided outside of the GNSS resolving module 100 and not be a part of the GNSS resolving module 100. A switch 125 may be provided at an input terminal of the smoothing filter 130, which may be realized by means of hardware or software. When the mode switching unit 120 controls to switch to the floating point solution mode, the floating point solution unit 122 outputs the floating point solution 122a, at the same time, the switch 125 closes the circuit of the floating point solution 122a so as to input the floating point solution 122a into the smoothing filter 130 to be smooth filtered; when the mode switching unit 120 controls to switch to the pseudo-range single point positioning mode, the single point positioning unit 123 outputs the single point solution 123a, at the same time, the switch 125 closes the circuit of the single point solution 123a so as to input the single point solution 123a into the smoothing filter 130 to be smooth filtered.

Wherein, the smoothing filter 130 is configured to perform a smooth filtering processing on the received floating point solution 122a or single point solution 123a to obtain a smooth floating point solution 132a or a smooth single point solution 133a. The smooth floating point solution 132a can obtain a smoother positioning result compared to the floating point solution 122a that has not been subjected to any smoothing processing, likewise, the smooth single point solution 133a can obtain a smoother positioning result compared to the single point solution 123a that has not been subjected to any smoothing processing. It shall be understood that the smooth filtering method or algorithm adopted by the smoothing filter 130 is non-restrictive.

Figure 4:
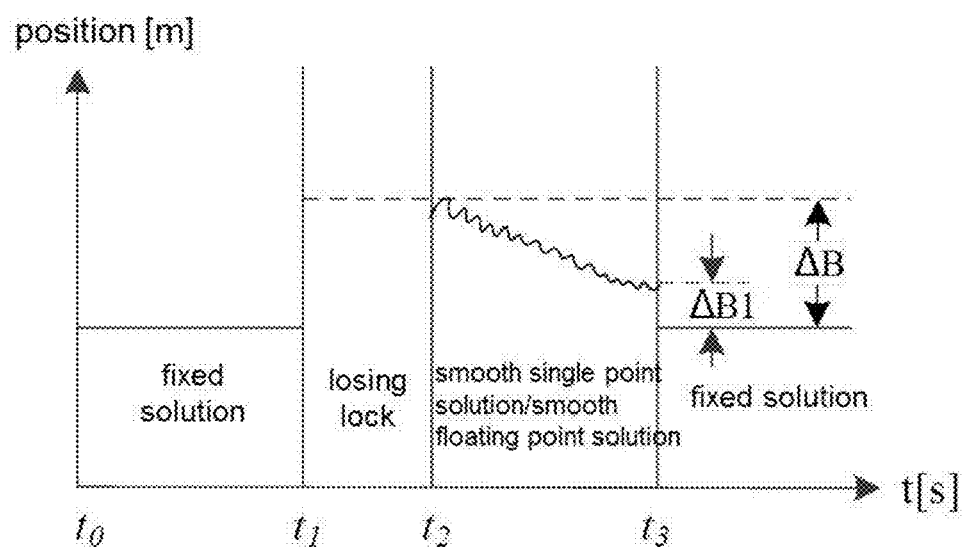
FIG. 4 is a schematic diagram of the performance of a navigation system using the smooth positioning technology.

It shall be noted that if the smooth floating point solution 132a or smooth single point solution 133a is directly used for positioning (with no fixed solution 121a being used as the positioning result), the positioning accuracy of pseudo-range single point positioning or floating point solution can be improved and a relatively accurate and smooth (i.e. greatly reduced noise of the single point solution and floating point solution) floating point solution positioning result or single point positioning result can be provided, nevertheless, corresponding deficiencies are found by the applicant. FIG. 4 schematically illustrates the performance under the floating point solution mode and the pseudo-range single point positioning mode when the smooth positioning technology is used. In FIG. 4, the horizontal axis represents time t, wherein t0, t1, t2 and t3 represent different positioning times. As shown in FIG. 4, when the GNSS signals lose lock, the smooth technology has no valid input signal, so it is impossible to realize the RTK resolving (as shown by the dashed lines in FIG. 4), accordingly, it is impossible to provide continuous position and speed information (the same deficiency exists in FIG. 3); besides, when the smooth floating point solution 132a or smooth single point solution 133a is directly used for positioning, the RMS error reaches ΔB compared to the positioning result from the fixed solution 121a, so the positioning accuracy is also unsatisfactory. Since the smooth single point solution and the corresponding single point solution have substantially the same RMS error, and the smooth floating point solution and the corresponding floating point solution have substantially the same RMS error, normally ΔB≈ΔA, and the optimal accuracy ΔB1≈ΔA1.

Still referring to FIG. 1, the integrated navigation system 10 is further provided with the integrated navigation filter 300. At an input terminal of the integrated navigation filter 300 which is connected to the GNSS resolving module 100, a switch 131 can be provided. The switch 131 can be realized by means of hardware or software. When the mode switching unit 120 controls to switch to the fixed solution mode, the fixed solution unit 121 outputs the fixed solution 121a, at the same time, the switch 131 closes the circuit of the fixed solution 121a so as to input the fixed solution 121a into the integrated navigation filter 300; when the mode switching unit 120 controls to switch to the floating point solution mode or pseudo-range single point positioning mode, the smoothing filter 130 outputs the smooth floating point solution 132a or smooth single point solution 133a, at the same time, the switch 131 turns on an output terminal of the smoothing filter 130 so as to input the smooth floating point solution 132a or smooth single point solution 133a into the integrated navigation filter 300.

The integrated navigation filter 300 also receives the inertial navigation solution 220a output from the INS 200, and then the respective solutions received under various modes and the respective inertial navigation solutions 220a received under various modes are subjected to an integrated filtering processing to obtain corresponding positioning and/or orientation variable error estimates 301a and sensor error estimate 302a.

Wherein the positioning and/or orientation variable error estimates 301a are provided to a combining unit 310 of the integrated navigation filter 300 to be combined with the inertial navigation solution 220a, thereby obtaining combined solutions.

Wherein the sensor error estimate 302a is fed back to the INS 200. The INS 200 revises a current output (e.g. acceleration and/or angular speed information) of the sensor in the inertial measurement unit 210 on the basis of the obtained sensor error estimate 302a so as to obtain revised acceleration and/or angular speed information; correspondingly, the strapdown mechanical arrangement unit 220 processes on the basis of the revised acceleration and/or angular speed information so as to obtained a more accurate revised inertial navigation solution 220a. In this case, the integrated navigation filter 300 combines said revised inertial navigation solution with the corresponding received fixed solution, smooth floating point solution or smooth single point solution, and since the acceleration and/or angular speed (positioning and/or orientation measurements) have been revised, the final positioning result is more accurate, and the positioning accuracy is improved accordingly.

Especially when the GNSS resolving module 100 works in the floating point solution mode, the integrated navigation filter 300 is further configured to calculate on the basis of the positioning and/or orientation variable error estimate 301a (e.g. position, speed and attitude error estimates) corresponding to the smooth floating point solution 132a and the received positioning and/or orientation measurements (e.g. the inertial navigation solution 220a) to obtain the corresponding integrated smooth floating point solution 312.

The integrated navigation filter 300 uses the smooth floating point solution 132a (instead of simply using the floating point solution 122a that has not undergone the smoothing processing) and the inertial navigation solution 220a to perform the integrated filtering processing under the floating point solution mode, so the obtained positioning and/or orientation variable error estimates 301a and sensor error estimate 302a will be more accurate. On the one hand, if the accurate positioning and/or orientation variable error estimates 301a are further combined with the inertial navigation solution 220a, the obtained integrated smooth floating point solution 312 will have a higher positioning accuracy; on the other hand, the relatively more accurate sensor error estimate 302a will be fed back to the INS 200 to correct the error of the sensor used therein, thus the inertial navigation solution 220a output from the INS 200 is revised to be more accurate, and when using said revised inertial navigation solution 220a to perform the integrated filtering processing or combining processing, the accuracy of the positioning and/or orientation variable error estimates 301a and sensor error estimate 302a can be further improved, and the accuracy of the integrated smooth floating point solution 312 can also be further improved. As a result, the positioning accuracy under the floating point solution mode can be significantly improved.

Especially when the GNSS resolving module 100 works in the pseudo-range single point positioning mode, the integrated navigation filter 300 is further configured to calculate on the basis of the positioning and/or orientation variable error estimates 301a (e.g. position, speed and attitude error estimates) corresponding to the smooth single point solution 133a and the received positioning and/or orientation measurements (e.g. the inertial navigation solution 220a) received under said mode so as to obtain the corresponding integrated smooth single point solution 313.

Likewise, the integrated navigation filter 300 uses the smooth single point solution 133a (instead of simply using the single point solution 123a that has not undergone the smoothing processing) and the inertial navigation solution 220a to perform the integrated filtering processing under the pseudo-range single point positioning mode, so the obtained positioning and/or orientation variable error estimates 301a and sensor error estimate 302a will be more accurate. On the one hand, if the accurate positioning and/or orientation variable error estimates 301a are further combined with the inertial navigation solution 220a, the obtained integrated smooth single point solution 313 will have a higher positioning accuracy; on the other hand, the relatively more accurate sensor error estimate 302a will be fed back to the INS 200 to correct the error of the sensor used therein, thus the inertial navigation solution 220a output from the INS 200 is more accurate, and when using said inertial navigation solution 220a to perform the integrated filtering processing or combining processing, the accuracy of the positioning and/or orientation variable error estimates 301a and sensor error estimate 302a can be further improved, and the accuracy of the integrated smooth single point solution 313 can also be further improved. As a result, the positioning accuracy under the pseudo-range single point positioning mode can be significantly improved.

It shall be noted that other information can also be input into the integrated navigation filter 300 for performing the integrated filtering processing, for example, status information of the carrier of the integrated navigation system (e.g. vehicle status information) can be input into the integrated navigation filter 300 to help to improve the positioning accuracy, especially under other modes than the fixed solution mode. The integrated navigation filter 300 can specifically be a Kalman filter, for example, in fact the specific type thereof or the integrated filtering processing algorithm adopted thereby are non-restrictive.

Figure 2:
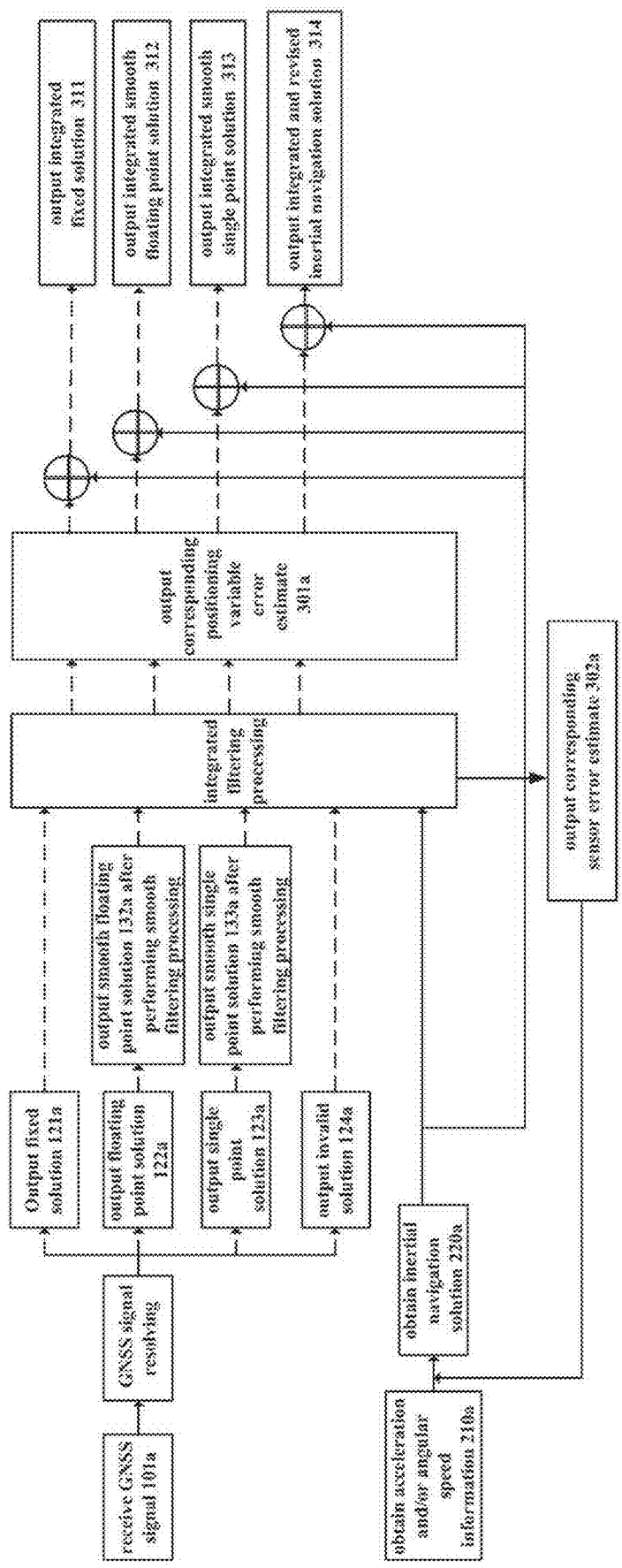
FIG. 2 is a schematic diagram of the working principle of the integrated navigation system in the embodiment as shown in FIG. 1.

In one embodiment, application of the integrated navigation filter 300 and the smoothing filter 130 in combination can improve the positioning accuracy in the case of losing lock. Wherein, the GNSS resolving module 100 is configured to have no valid output under the circumstance of losing lock, for example, an invalid solution 124a (as shown in FIG. 2) is output to the integrated navigation filter 300. Correspondingly, the integrated navigation filter 300 is further configured to, under the circumstance of losing lock, calculate the inertial navigation solution 220 received from the INS 200 and the positioning and/or orientation variable error estimate 301a that has been obtained before losing lock to obtain an integrated and revised inertial navigation solution 314 (as shown in FIG. 2). It shall be appreciated that said positioning and/or orientation variable error estimate 301a that has been obtained can be obtained under the floating point solution mode or the pseudo-range single point positioning mode before losing lock. Said error estimate has a high accuracy since it is obtained on the basis of the smooth floating point solution 132a or the smooth single point solution 133a, besides, the accuracy can still be kept in a certain period of time after losing lock. Thus the positioning and/or orientation variable error estimates 301a that have been obtained under the floating point solution mode or the pseudo-range single point positioning mode can still be used under the circumstance of losing lock (i.e. as the initial value in the lock losing state), and if said positioning and/or orientation variable error estimates 301a are combined with the inertial navigation solution 220a output by the INS 200 at this point, the accuracy of the obtained integrated and revised inertial navigation solution 314a can be guaranteed.

In one embodiment, the INS 200 is further configured to revise the current output (e.g. the acceleration and/or angular speed information 210a) of the inertial measurement unit 210 under the circumstance of losing lock by using the sensor error estimate 302a that has been obtained before losing lock as the initial value, thereby obtaining the revised inertial navigation solution 220a corresponding to the circumstance of losing lock. When using the combining unit 310 of the integrated navigation filter 300 for combination, the used inertial navigation solution 220a received from the INS 200 under the circumstance of losing lock can be said revised inertial navigation solution 220a, so that the accuracy of the integrated and revised inertial navigation solution 314a can be further improved.

Of course, if the GNSS resolving module 100 works in the fixed solution mode before losing lock, the already obtained positioning and/or orientation variable error estimates 301a and the sensor error estimate 302a as used during losing lock are obtained under the fixed solution mode before losing lock, so they have higher accuracy.

In one embodiment, the integrated navigation filter 300 is configured to perform integrated filtering processing on the received fixed solution 121a and the received inertial navigation solution 220a under an initial state so as to obtain corresponding initial positioning and/or orientation variable error estimates 301a and initial the sensor error estimate 302a. That is to say, under the initial state, the positioning and/or orientation variable error estimates 301a and the sensor error estimate 302a in the fixed solution mode are usually used as the initial error estimates, which have higher accuracy. Of course, a skilled person shall understand that the positioning and/or orientation variable error estimates 301a and the sensor error estimate 302a in the floating point solution mode or the pseudo-range single point positioning mode can also be used in the initial state. It shall be appreciated that during operation of the integrated navigation system 10, the positioning and/or orientation variable error estimates 301a and the initial sensor error estimate 302a may change dynamically under different modes or under the same mode.

Now further referring to FIG. 1 and FIG. 2, the working principles of the integrated navigation system 10 according to the embodiment of the present invention under different modes will be described, and the positioning method thereof will be illustrated. In FIG. 2, the dotted arrows represent optional method procedures corresponding to optional working modes.

During movement of the integrated navigation system 10 or its carrier, the antenna 101 of the integrated navigation system 10 can continuously receive GNSS signals 101a and transmit them to the GNSS signal processing unit 110; then the GNSS resolving module 100 resolves the GNSS signals 101a that have been processed by the GNSS signal processing unit 110. The GNSS resolving module 100 chooses the working modes mainly depending on the different working environments and signal qualities. Under different working modes, the GNSS resolving module 100 resolves and outputs different solutions; wherein the fixed solution 121a is output when working in the fixed solution mode; the floating point solution 122a is output when working in the floating point solution mode; and the single point solution 123a is output when working in the pseudo-range single point positioning mode. When the GNSS signals 101a lose lock, the GNSS resolving module 100 outputs the invalid solution 124a, of course.

During movement of the integrated navigation system 10 or its carrier, the INS 200 works concurrently with the GNSS resolving module 100, wherein the inertial measurement unit 210 obtains the acceleration and/or angular speed information 210a, and the strapdown mechanical arrangement unit 220 outputs the corresponding inertial navigation solution 220a based on the acceleration and/or angular speed information 210a.

The working process of the integrated navigation system of the embodiment of the present invention is as follows:

When the integer ambiguity is fixed successfully, i.e. when the GNSS resolving module 100 works in the fixed solution mode, the fixed solution unit 121 outputs the fixed solution 121a. The integrated navigation filter 300 receives said fixed solution 121a and performs integrated filtering on said fixed solution 121a and the inertial navigation solution 220a output by the INS 200 so as to output the position, speed and attitude error estimates, i.e. the positioning and/or orientation variable error estimates 301a (as shown in FIG. 2). The position, speed and attitude error estimates 301a are then combined with the inertial navigation solution 220a output by the INS 200 to obtain a combined fixed solution 311. Meanwhile, the integrated navigation filter 300 outputs the inertial sensor error estimate, i.e. the sensor error estimate 302a, which is fed back to the INS 200 for correcting the error of the inertial sensor (which serves as an inertial navigation device) of the inertial measurement unit 210, for example, the acceleration and/or angular speed information 210a is revised on the basis of the sensor error estimate 302a, and the strapdown mechanical arrangement unit 220 can process on the basis of the revised acceleration and/or angular speed information 210a so as to output the revised inertial navigation solution 220a. The revised inertial navigation solution 220a can continue to serve as the input of the integrated navigation filter 300. The combined fixed solution 311 can be output as a positioning result under the fixed solution mode, and the positioning accuracy is so high as to reach a centimeter level, for example. In this embodiment, reference can be made to the document "*GPS and Inertial Integration*" in Parkinson, B. W, editor, Global Positioning System: Theory and Application, Volume 2, pp. 187-220, American Institute of Aeronautics and Astronautics, Washington, D.C. for the specific design of the integrated navigation filter 300; said document is included in this application by full-text citation.

Still referring to FIG. 2, when the integer ambiguity is not fixed successfully, the GNSS resolving module 100 may work in the floating point solution mode. The floating point solution unit 122 outputs the floating point solution 122a. The smoothing filter 130 performs a smooth filtering processing on said floating point solution 122a to output the smooth floating point solution 132a. The integrated navigation filter 300 receives said smooth floating point solution 132a and performs an integrated filtering processing on said smooth floating point solution 132a and the inertial navigation solution 220a output from the INS 200 to output the corresponding position, speed and attitude error estimates 301a (as shown in FIG. 2). Said position, speed and attitude error estimates 301a are then combined with the inertial navigation solution 220a to obtain the integrated smooth floating point solution 312. Meanwhile, the integrated navigation filter 300 outputs the corresponding inertial sensor error estimate, i.e. the sensor error estimate 302a, which is fed back to the INS 200 for correcting the error of the inertial sensor (which serves as an inertial navigation device) of the inertial measurement unit 210, for example, the acceleration and/or angular speed information 210a is revised on the basis of the sensor error estimate 302a, and the strapdown mechanical arrangement unit 220 can process on the basis of the revised acceleration and/or angular speed information 210a so as to output the revised inertial navigation solution 220a. The revised inertial navigation solution 220a can continue to serve as the input of the integrated navigation filter 300. The integrated smooth floating point solution 312 can be output as a positioning result under the floating point solution mode, and the positioning accuracy is improved. As for the design of the smoothing filter 130 in this embodiment, reference can be made to the document "Groves, D. Paul. (2008). "*Principles of GNSS, Inertial, and Multisensor Integrated Navigation Systems*." pp 90-92, ARTECH HOUSE Press; and the document: Kaplan D. Elliott, Christopher J. Hegarty. (2006). "*Understanding GPS Principles and Applications, second edition*." pp 407-409, ARTECH HOUSE Press. These documents are included in this application by full-text citation.

Still referring to FIG. 2, when the RTK resolving condition is not satisfied (i.e. when it is impossible to work in the fixed solution mode and the floating point solution mode), the GNSS resolving module 100 works in the pseudo-range single point positioning mode. The single point positioning unit 123 outputs the single point solution 123a. The smoothing filter 130 performs a smooth filtering processing on said single point solution 123a to output the smooth single point solution 133a. The integrated navigation filter 300 receives said smooth single point solution 133a, and then performs an integrated filtering processing on said smooth single point solution 133a and the inertial navigation solution 220a output from the INS 200 to output the corresponding position, speed and attitude error estimates 301a (which are a specific type of the positioning and/or orientation variable error estimates, as shown in FIG. 2). Said position, speed and attitude error estimates 301a are then combined with the inertial navigation solution 220a to obtain the integrated smooth single point solution 313. Meanwhile, the integrated navigation filter 300 outputs the corresponding inertial sensor error estimate, i.e. the sensor error estimate 302a, which is fed back to the INS 200 for correcting the error of the inertial sensor (which serves as an inertial navigation device) of the inertial measurement unit 210, for example, the acceleration and/or angular speed information 210a is revised on the basis of the sensor error estimate 302a, and the strapdown mechanical arrangement unit 220 can process on the basis of the revised acceleration and/or angular speed information 210a so as to output the revised inertial navigation solution 220a. The revised inertial navigation solution 220a can continue to serve as the input of the integrated navigation filter 300. The integrated smooth single point solution 313 can be output as a positioning result under the pseudo-range single point positioning mode, and the positioning accuracy is improved.

Still referring to FIG. 2, in the case of the GNSS signals 101a losing lock, the GNSS resolving module 100 outputs an invalid solution, which is indicated by invalid solution 124a, the INS 200 outputs the inertial navigation solution 220a, and the integrated navigation filter 300 stores or outputs the position, speed and attitude error estimates 301a that are obtained before losing lock and used as the positioning and/or orientation variable error estimates, then said position, speed and attitude error estimates 301a are combined with the inertial navigation solution 220a to obtain the integrated and revised inertial navigation solution 314. The integrated and revised inertial navigation solution 314 can be output as a positioning result in the circumstance of losing lock.

To facilitate understanding of the advantages and effects of the integrated navigation system 10 and its positioning method in the above embodiments, descriptions will be given with reference to the conventional GNSS/INS loose integrated navigation system. In the existing GNSS/INS loose integrated navigation system, the floating point solution output by the floating point solution unit under the floating point mode is directly input into the integrated navigation filter to be subjected to an integrated filtering processing therein together with the inertial navigation solution from the INS, and finally the integrated floating point solution is output; the single point solution output by the single point solution unit under the pseudo-range single point positioning mode is directly input into the integrated navigation filter to be subjected to an integrated filtering processing therein together with the inertial navigation solution from the INS, and finally the integrated single point solution is output; in the case of losing lock, the integrated navigation filter outputs the integrated inertial navigation solution.

The conventional GNSS/INS loose integrated navigation system can use the acceleration and angular speed output by the INS to estimate the position, speed and attitude of the carrier and can continuously output positioning results, thus solving the problem of losing lock of satellite signals. In the case of losing lock of satellite signals, the GNSS resolving module has no valid output, and the position, speed and attitude accuracy of the GNSS/INS loose integrated navigation system mainly depends on the accuracy of inertial navigation (e.g. depending on the accuracy of the inertial measurement sensor in the INS), but since the error of the INS accumulates over time, the GNSS/INS loose integrated navigation system has a low positioning accuracy, especially when the satellite signals have lost lock for a long time. With respect to different time lengths of losing lock of the satellite signals, when inertial sensors of different performances are used, the errors calculated by the strapdown mechanical arrangement unit differ, for example, with respect to a time length of 10 seconds of losing lock of the satellite signals, the MEMS IMU with an error of 0.07 deg/s is used, and the position error can be about 50 centimeters. Therefore, the existing GNSS/INS loose integrated navigation system relies on the high-performance and high-cost INS to solve or alleviate the problem of low positioning accuracy under the circumstance of losing lock.

Figure 5:
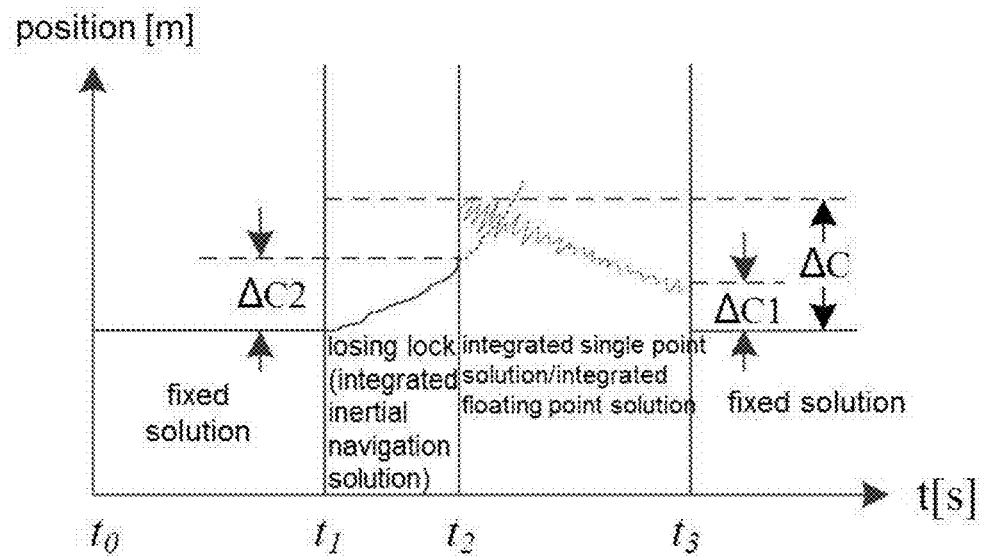
FIG. 5 is a schematic diagram of the performance of the prior art GNSS/INS integrated navigation system.

More specifically, FIG. 5 of the present embodiment schematically illustrates the performance of the conventional GNSS/INS loose integrated navigation system by taking a short time (less than 5 seconds) losing lock of the satellite as an example. In FIG. 5, the horizontal axis represents time t, wherein t0, t1, t2 and t3 represent different positioning times. When the GNSS signals lose lock, the integrated navigation system outputs the integrated inertial navigation solution, whose RMS error is $\Delta C2$. When the GNSS restores to the single point solution or floating point solution, the integrated navigation system will output a single point solution and a floating point solution that have been integrated with the inertial navigation, and the RMS error thereof is $\Delta C$, the optimal accuracy is $\Delta C1$. At the time when the GNSS signals restore from losing lock to the single point solution or floating point solution (time t2 in FIG. 5), the conventional integrated navigation system filter cannot determine which solution has a higher accuracy or which solution has a more reliable accuracy, the integrated inertial navigation solution in the lock losing state or the GNSS single point solution or floating point solution of the present moment. Owing to this ambiguous state, the RMS error $\Delta C$ output from the integrated navigation system is still about the level of $\Delta A$ and $\Delta B$, i.e. $\Delta C \approx \Delta B \approx \Delta A$. Meanwhile, the optimal accuracy $\Delta C1 \approx \Delta B1 \approx \Delta A1$.

In addition, the conventional GNSS/INS loose integrated navigation system also has the defect of low positioning accuracy under the floating point solution mode or pseudo-range single point positioning mode due to the following reasons:

(1) when the integer ambiguity is not fixed successfully, the GNSS resolving module switches from the fixed solution mode to the floating point solution mode or pseudo-range single point positioning mode, but since neither the floating point solution nor the single point solution has a high accuracy, the integrated floating point solution or integrated single point solution output from the GNSS/INS loose integrated navigation system has low positioning accuracy;

(2) if no differential data has been received from the reference station for a long time, a difference is found between the single point solution output in the pseudo-range single point positioning mode and the inertial navigation solution output by the INS so as to obtain the position, speed and attitude error estimates, and said error estimates are combined with the inertial navigation solution output by the INS to obtain a final resolving result. Since the pseudo-range single point positioning mode has a low positioning accuracy, the integrated single point solution output from the conventional GNSS/INS loose integrated navigation system has a low positioning accuracy.

Figure 6:
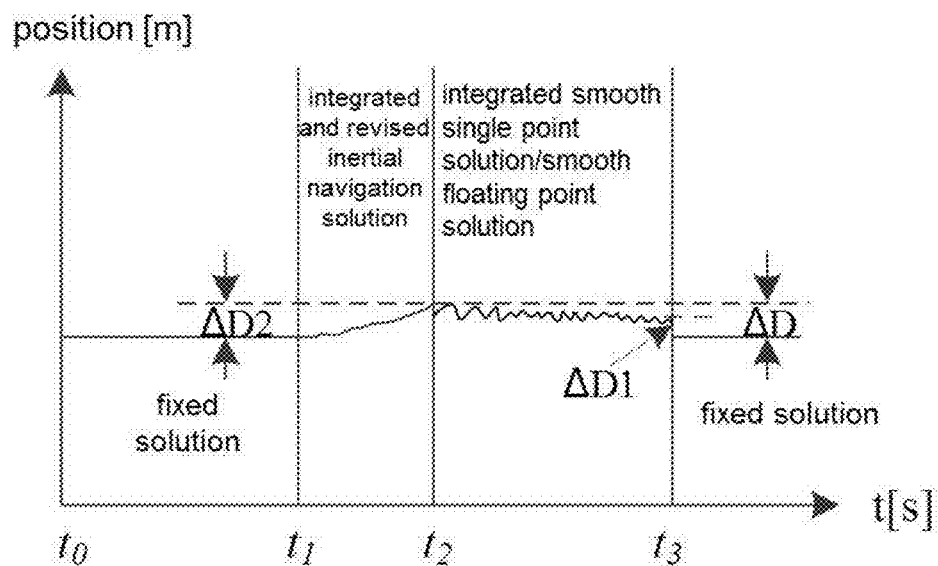
FIG. 6 is a schematic diagram of the performance of the integrated navigation system in the embodiment as shown in FIG. 1

FIG. 6 is a schematic diagram of the performance of the integrated navigation system in the embodiment as shown in FIG. 1. In FIG. 6, the horizontal axis represents time t, wherein t0, t1, t2 and t3 represent different positioning times. The performance of the integrated navigation system of the present invention will be illustrated below by comparing FIG. 3, FIG. 4, FIG. 5 and FIG. 6.

In the floating point solution mode, the GNSS resolving module 100 can resolve to obtain the floating point solution 122a. The smoothing filter can smooth the floating point solution 122a to obtain the smooth floating point solution 132a. The integrated navigation filter 300 performs an integrated filtering processing on the smooth floating point solution 132a and the inertial navigation solution 220a to obtain the position, speed and attitude error estimates 301a that serve as the positioning and/or orientation variable error estimates. Said position, speed and attitude error estimates 301a are combined with the inertial navigation solution 220a output from the INS 200 to obtain the integrated smooth floating point solution 132a. In the floating point solution mode, the integrated navigation filter 300 uses the smooth floating point solution 132a (instead of simply using the floating point solution 122a as in the existing GNSS/INS integrated navigation system) and the inertial navigation solution 220a to perform the integrated filtering processing, so the correspondingly obtained position, speed and attitude error estimates 301a that serve as the positioning and/or orientation variable error estimates and the obtained sensor error estimate 302a will be more accurate. Therefore, on the one hand, the integrated smooth floating point solution 312 obtained on the basis of the accurate position, speed and attitude error estimates 301a has higher positioning accuracy, on the other hand, the inertial navigation solution 220a can be revised to have a higher accuracy on the basis of the accurate sensor error estimate 302a, thus helping to improve the positioning accuracy of the integrated smooth floating point solution 312. Specifically, the RMS error $\Delta D$ deviated from the fixed solution under the floating point solution mode as shown in FIG. 6 is obviously smaller than $\Delta A$ as shown in FIG. 3, $\Delta B$ as shown in FIG. 4 and $\Delta C$ as shown in FIG. 5, i.e. $\Delta D \ll \Delta C \approx \Delta B \approx \Delta A$. Meanwhile, the optimal accuracy $\Delta D1 < \Delta C1 \approx \Delta B1 \approx \Delta A1$.

Similar to the floating point solution mode as described above, in the pseudo-range single point positioning mode, the positioning accuracy can be greatly improved (i.e. the integrated smooth floating point solution 313 has a high positioning accuracy). The RMS error $\Delta D$ of the integrated smooth single point solution obtained in the pseudo-range single point positioning mode being deviated from the fixed solution as shown in FIG. 6 is obviously smaller than $\Delta A$ as shown in FIG. 3, $\Delta B$ as shown in FIG. 4 and $\Delta C$ as shown in FIG. 5, i.e. $\Delta D \ll \Delta C \approx \Delta B \approx \Delta A$. Meanwhile, the optimal accuracy $\Delta D1 < \Delta C1 \approx \Delta B1 \approx \Delta A1$.

In the case of losing lock of the satellite signals, the GNSS resolving module 100 of the integrated navigation system 10 has no valid output, and the INS 200 outputs the inertial navigation solution 220a, which is processed by the integrated navigation filter 300 to obtain the integrated and revised inertial navigation solution 314. Before the GNSS signals 101a lose lock, the smoothing filter 130 has already smoothed the single point solution 123a or the floating point solution 122a, so that the position, speed and attitude error estimates 301a that serve as the positioning and/or orientation variable error estimates and the sensor error estimate 302a obtained by the integrated navigation filter 300 have higher accuracy or precision, and even when the GNSS signals 101a lose lock, the accuracies of these position, speed and attitude error estimates 301a and sensor error estimate 302a can still be kept for a certain period of time, thus in the circumstance of losing lock, said sensor error estimate 302a is used for revising the current output of the inertial measurement unit 210, and the inertial navigation solution 220a output by the INS 200 is more accurate, and when said position, speed and attitude error estimates 301a are combined with the inertial navigation solution 220a of higher accuracy, the resulted integrated and revised inertial navigation solution 314 will have higher accuracy compared to the existing ways of combination. Of course, those skilled in the art shall understand that if said position, speed and attitude error estimates 301a with higher accuracy are combined with the un-revised inertial navigation solution 220a, the resulted integrated and revised inertial navigation solution 314a will still have a higher accuracy than the existing combinations, only that the accuracy is not as high as that obtained from the combination with the revised inertial navigation solution 220a. To be specific, referring to FIG. 6, when the satellite signals lose lock, the integrated navigation system can obtain continuous position and speed information, meanwhile, the RMS error $\Delta D2$ deviated from the fixed solution is smaller, i.e. $\Delta D2<\Delta C2$. Meanwhile, in the case of a short time losing lock of the GNSS signals, especially when the time of losing lock is only 1~3 s (e.g. 1 s, 1.1 s, 1.2 s, 1.5 s, 2 s, 2.1 s, 2.2 s, 2.5 s, 3 s), $\Delta D2<\Delta B$. Therefore, at the time when the GNSS restores to the smooth single point solution or smooth floating point solution (time t2 in FIG. 6), the integrated navigation filter 300 will take the integrated and revised inertial navigation solution at time t2 as the initial value, and use the smooth single point solution or smooth floating point solution as the integrated measurement to obtain the final optimal output, wherein the RMS error $\Delta D \approx \Delta D2$, and the optimal accuracy $\Delta D1<\Delta C1$.

It shall be noted that advantages of the present invention are depicted by the integrated navigation system 10 in the above embodiments by taking short-time lock losing of the GNSS satellite signals as an example, but the present invention is not limited to the circumstance of short time lock losing of the GNSS satellite signals, for example, the present invention is also applicable to the circumstance of long time lock losing of the GNSS satellite signals, wherein the IMU of the corresponding accuracy level will be used, and the advantages thereof are similar to those in the case of short time lock losing, so they will not be elaborated any more.

More detailed analyses of the advantages of the present invention are given as follows:

First, technically, the integrated navigation system 10 of the embodiment of the present invention has the smoothing filter 130 combined with the integrated navigation filter 300 to introduce the smooth solution into the integrated navigation filter 300 to perform an integrated filtering processing. Compared to the conventional integrated navigation filter, the integrated navigation filter of the present invention uses more accurate measurements in addition to the fixed solution, and new computing modes are added in the processing of the integrated navigation filter. This means that the range of error between the solution (fixed solution) having the highest accuracy and the solution (e.g. floating point solution, single point solution) with low accuracy is greatly reduced, which will improve stability of various solutions output by the integrated navigation system 10.

Moreover, as far as the system is concerned, in the conventional integration of GNSS and INS, according to the positioning accuracy of GNSS, the inertial measurement sensor with an equivalent accuracy will be selected from the INS, that is, the high accuracy GNSS resolving module usually needs to be integrated with expensive high-performance inertial measurement unit. The design of introducing a smoothing filter into the GNSS/INS integrated system in the present invention can obtain the sensor error estimate 302a with a higher accuracy, which is fed back to the INS for revising the inertial navigation solution 220a, and this can help the integrated and revised inertial navigation solution to remain at a better accuracy level when the GNSS signals lose lock. In addition, while ensuring the positioning accuracy, the requirement on the performance of the inertial sensor of the INS is lowered when the high-accuracy GNSS resolving module is integrated with the INS to form the integrated navigation system, thus the cost of the integrated navigation system 10 can be reduced and an effective solution is provided for the modularized and highly-integrated GNSS/INS integrated navigation system with high accuracy.

It shall be noted that the integrated navigation system 10 in the above embodiments of the present invention can be applied to various mobile carriers like vehicles, unmanned aerial vehicle, etc., and the specific application thereof is non-restrictive.

It shall be noted that the "positioning and/or orientation variable" as mentioned in positioning and/or orientation variable error estimates 301a is not limited to the position, speed and attitude, the positioning and/or orientation variable may include position, at least one of speed and attitude, or it may include other types of parameter variables for positioning or navigation.

It shall be appreciated that when using other types of auxiliary navigation modules (such as odometer, radar or visual sensor) to replace the INS of the embodiment as shown in FIG. 1, the output positioning and/or orientation measurements will change from the inertial navigation solutions 220a into the corresponding types of solutions, which are subjected to an integrated filtering processing together with the smooth solution output by the GNSS resolving module 100 in the integrated navigation filter 300, then the corresponding more accurate positioning and/or orientation variable error estimates 301a and sensor error estimate 302a can also be output, besides, said positioning and/or orientation variable error estimates 301a can be combined with the solution output from the auxiliary navigation module, and the sensor error estimate 302a can be fed back to the auxiliary navigation module to revise the solution output from the auxiliary navigation module. Thus the advantages of high positioning accuracy and low implementation cost can also be realized.

As will be appreciated by those skilled in the art, aspects of the present invention can be embodied as systems, methods or computer program products. Thus aspects of the present invention can be in the following forms: full hardware realization, full software realization (including firmware, resident software, microcode, etc.) or realizations that are generally called "service", "circuit", "circuit system", "module" and/or "processing system" in this application, which have the software and hardware aspects combined. In addition, aspects of the present invention can be in the form of computer program products embodied in one or more computer-readable mediums on which computer-readable program codes are implemented.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code and/or executable instructions embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Computer program instructions may be provided to a processor of a general purpose computer, special purpose computer, such as an image processor or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions and acts specified herein.

It shall also be noted that in some alternative implementations, the functions/operations indicated in the blocks may not take place in the order shown in the flow chart. For example, two blocks shown sequentially may actually be carried out at substantially the same time, or they can be carried out in an inverted sequence sometimes, depending on the functions/operations involved. Although particular step sequences are shown, disclosed, and claimed, it should be appreciated that steps may be performed in any order, separated or combined unless otherwise indicated and will still benefit from the present disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An integrated navigation system, comprising:
    a Global Navigation Satellite System (GNSS) resolving module;
    an integrated navigation filter; and
    an auxiliary navigation module using a sensor;
    wherein the auxiliary navigation module outputs corresponding positioning and/or orientation measurements to the integrated navigation filter; the Global Navigation Satellite System (GNSS) resolving module outputs a floating point solution or a single point solution; the integrated navigation system further comprises:
    a smoothing filter, corresponding to the Global Navigation Satellite System (GNSS) resolving module, wherein the smoothing filter is configured to perform a smooth filtering processing on the floating point solution or single point solution to obtain a smooth floating point solution or a smooth single point solution respectively;
    wherein the integrated navigation filter is configured to perform integrated filtering on the received smooth floating point solution, smooth single point solution and the corresponding received positioning and/or orientation measurements so as to obtain corresponding positioning and/or orientation variable error estimates and sensor error estimates.

2. The integrated navigation system according to claim 1, wherein the integrated navigation filter is further configured to
    perform an integrated calculation on the basis of the positioning and/or orientation variable error estimates corresponding to the smooth floating point solution and the corresponding received positioning and/or orientation measurements so as to obtain a corresponding integrated smooth floating point solution, and/or
    perform an integrated calculation on the basis of the positioning and/or orientation variable error estimates corresponding to the smooth single point solution and the corresponding received positioning and/or orientation measurements so as to obtain a corresponding integrated smooth single point solution.

3. The integrated navigation system according to claim 1, wherein the auxiliary navigation module is further configured to
    revise a current output of the sensor based on the already obtained sensor error estimate so as to obtain revised positioning and/or orientation measurements which serve as the corresponding received positioning and/or orientation measurements.

4. The integrated navigation system according to claim 1, wherein the auxiliary navigation module is an inertial navigation system, and the positioning and/or orientation measurements include an inertial navigation solution output from the inertial navigation system.

5. The integrated navigation system according to claim 4, wherein the inertial navigation system comprises:
an inertial measurement unit provided with the sensor, which is used for at least outputting acceleration and/or angular speed information; and
a strapdown mechanical arrangement unit, which is used for processing on the basis of the revised acceleration and/or angular speed information to obtain the corresponding inertial navigation solution, wherein, the revised acceleration and/or angular speed information is obtained by revising the acceleration and/or angular speed information on the basis of the already obtained sensor error estimate.

6. The integrated navigation system according to claim 1, wherein the Global Navigation Satellite System (GNSS) resolving module outputs a fixed solution, a floating point solution or a single point solution, and it comprises:
a fixed solution unit for outputting a corresponding fixed solution when the Global Navigation Satellite System (GNSS) resolving module works in a fixed solution mode;
a floating point solution unit for outputting a corresponding floating point solution when the Global Navigation Satellite System (GNSS) resolving module works in a floating point solution mode; and
a single point positioning unit for outputting a corresponding single point solution when the Global Navigation Satellite System (GNSS) resolving module works in a pseudo-range single point positioning mode;
wherein said integrated navigation filter further performs an integrated filtering on the fixed solution and the corresponding received positioning and/or orientation measurements so as to obtain corresponding positioning and/or orientation error estimates and sensor error estimate.

7. The integrated navigation system according to claim 1, wherein the Global Navigation Satellite System (GNSS) resolving module outputs a fixed solution, one of the fixed solution, floating point solution and single point solution are selected and output by the Global Navigation Satellite System (GNSS) resolving module,
wherein, the integrated navigation filter is configured to perform an integrated filtering processing on the received fixed solution and the received positioning and/or orientation measurements so as to obtain the corresponding positioning and/or orientation variable error estimates and sensor error estimate; or
the integrated navigation filter is configured to calculate said positioning and/or orientation variable error estimates corresponding to the fixed solution and said received positioning and/or orientation measurements in combination so as to obtain a corresponding integrated fixed solution.

8. The integrated navigation system according to claim 1, wherein the Global Navigation Satellite System (GNSS) resolving module is configured to output an invalid solution to the integrated navigation filter in the case of losing lock;
wherein, said integrated navigation filter is further configured to, under the circumstance of losing lock, calculate in combination the positioning and/or orientation measurements received from the auxiliary navigation module and the positioning and/or orientation variable error estimates that have been obtained before losing lock so as to obtain an integrated revised inertial navigation solution.

9. The integrated navigation system according to claim 8, wherein the auxiliary navigation module is further configured to revise the current output of the sensor under the circumstance of losing lock on the basis of the sensor error estimate that has been obtained before losing lock so as to obtain the positioning and/or orientation measurements corresponding to the circumstance of losing lock.

10. The integrated navigation system according to claim 1, wherein the Global Navigation Satellite System (GNSS) resolving module outputs the fixed solution, and the integrated navigation filter is configured to perform an integrated filtering processing on the received fixed solution and the received positioning and/or orientation measurements under an initial state so as to obtain corresponding initial positioning and/or orientation variable error estimates and initial the sensor error estimate.

11. A receiving device comprising the integrated navigation system, wherein the integrated navigation system, comprises:
a Global Navigation Satellite System (GNSS) resolving module;
an integrated navigation filter; and
an auxiliary navigation module using a sensor;
wherein the auxiliary navigation module outputs corresponding positioning and/or orientation measurements to the integrated navigation filter; the Global Navigation Satellite System (GNSS) resolving module outputs a floating point solution or a single point solution; the integrated navigation system further comprises:
a smoothing filter, corresponding to the Global Navigation Satellite System (GNSS) resolving module, wherein the smoothing filter is configured to perform a smooth filtering processing on the floating point solution or single point solution to obtain a smooth floating point solution or a smooth single point solution respectively;
wherein the integrated navigation filter is configured to perform integrated filtering on the received smooth floating point solution, smooth single point solution and the corresponding received positioning and/or orientation measurements so as to obtain corresponding positioning and/or orientation variable error estimates and sensor error estimates.

12. A positioning method of the integrated navigation system, which comprises:
receiving satellite signals;
resolving the received satellite signals according to qualities of the received satellite signals to obtain a floating point solution or a single point solution;
performing smooth filtering processing to the floating point solution or single point solution so as to obtain a smooth floating point solution or a smooth single point solution respectively; and
performing integrated filtering to the obtained smooth floating point solution or smooth single point solution and corresponding received positioning and/or orientation measurements so as to obtain corresponding positioning and/or orientation variable error estimates and sensor error estimate.

13. The positioning method according to claim 12, where said positioning method further comprises:
performing an integrated calculation on the basis of the positioning and/or orientation variable error estimates corresponding to the smooth floating point solution and the received positioning and/or orientation measurements so as to obtain a corresponding integrated smooth floating point solution; and/or performing an integrated calculation on the basis of the positioning and/or orientation variable error estimates corresponding to the smooth single point solution and the received positioning and/or orientation measurements so as to obtain a corresponding integrated smooth single point solution.

14. The positioning method according to claim 12, wherein said positioning method further comprises:
revising a current output of the sensor based on the already obtained sensor error estimate so as to obtain revised positioning and/or orientation measurements which serve as the corresponding received positioning and/or orientation measurements.

15. The positioning method according to claim 12, wherein the positioning and/or orientation measurements include an inertial navigation solution output from the inertial navigation system in the integrated navigation system.

16. The positioning method according to claim 15, which further comprises:
at least outputting acceleration and/or angular speed information;
revising the acceleration and/or angular speed information based on the already obtained sensor error estimate; and
processing on the basis of the revised acceleration and/or angular speed information to obtain the corresponding revised inertial navigation solution as the inertial navigation solution output by the inertial navigation system.

17. The positioning method according to claim 12, wherein a fixed solution is obtained by resolving according to the qualities of the received satellite signals;
wherein the positioning method further comprises,
performing an integrated filtering processing to the received fixed solution and the corresponding received positioning and/or orientation measurements so as to obtain the corresponding positioning and/or orientation variable error estimates and sensor error estimate, and
calculating said positioning and/or orientation variable error estimates corresponding to the fixed solution and the corresponding received positioning and/or orientation measurements in combination so as to obtain a corresponding integrated fixed solution.

18. The positioning method according to claim 12, which further comprises:
under the circumstance of losing lock, calculating in combination the received positioning and/or orientation measurements and the positioning and/or orientation variable error estimates that have been obtained before losing lock so as to obtain an integrated and revised inertial navigation solution.

19. The positioning method according to claim 18, which further comprises
revising the current output of the sensor under the circumstance of losing lock on the basis of the sensor error estimate that has been obtained before losing lock so as to obtain the positioning and/or orientation measurements corresponding to the circumstance of losing lock.

20. The positioning method according to claim 17, which further comprises
performing integrated filtering processing on the received fixed solution and the received positioning and/or orientation measurements under an initial state so as to obtain corresponding initial positioning and/or orientation variable error estimates and initial the sensor error estimate.

* * * * *